UNITED STATES PATENT OFFICE.

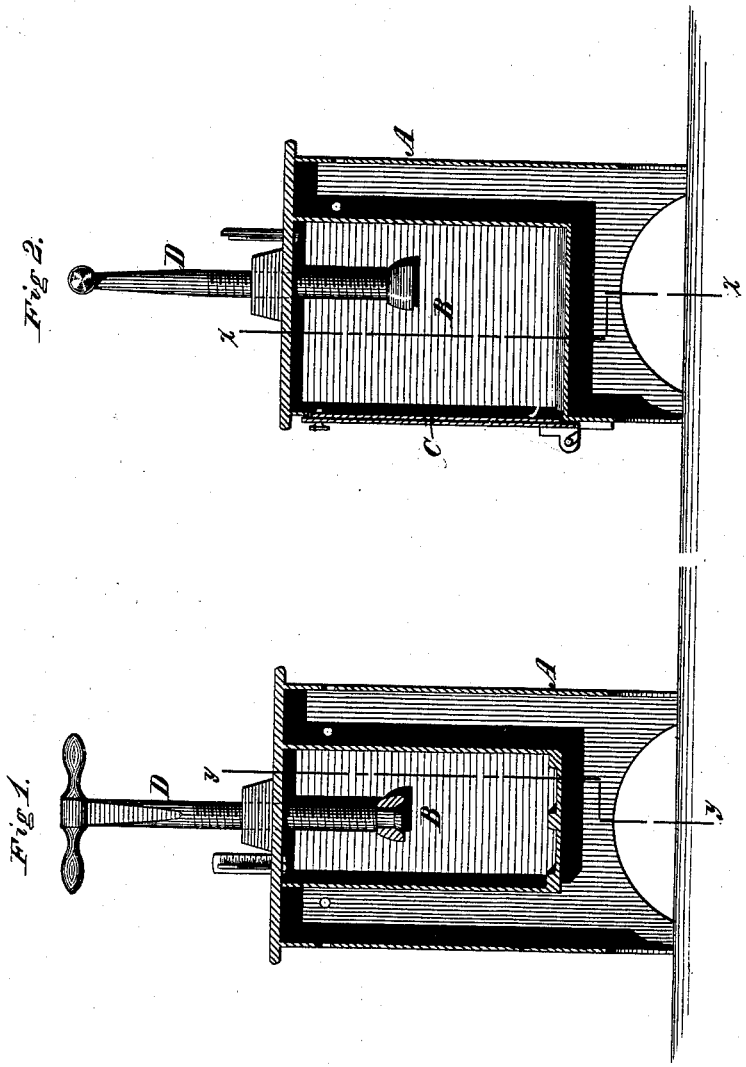

FERDINAND HEINDSMANN, OF NEW YORK, N. Y., ASSIGNOR TO SAMUEL S. WHITE, OF PHILADELPHIA, PENNSYLVANIA.

IMPROVEMENT IN DENTAL VULCANIZING APPARATUS.

Specification forming part of Letters Patent No. 165,328, dated July 6, 1875; application filed June 26, 1875.

*To all whom it may concern:*

Be it known that I, FERDINAND HEINDSMANN, of the city, county, and State of New York, have invented a certain new and useful Dental Heating Apparatus, of which the following is a specification:

My invention contemplates the treatment of dental plates, of celluloid or vulcanite, by dry heat while pressed in suitable molds or flasks; and my invention consists in an improved apparatus designed for this purpose.

In the accompanying drawings, Figure 1 represents a vertical section through my improved apparatus on the line $x$ $x$ of Fig. 2, and Fig. 2 a similar section at right angles to that of Fig. 1 on the line $y$ $y$ of said figure.

The apparatus consists of an open-bottom shell or casing, A, closed at the top, but with its walls perforated for the escape of the products of combustion. An oven or heater chamber, B, is united to the top and one side wall of this shell in such a way as to leave a passage-way around it on three sides, as shown in the drawing, room being left for the insertion of a lamp or burner under the bottom of the oven. A door, C, affords access to the oven, and a clamp-screw, D, passing down through it serves to press the flasks or articles to be molded in the usual way. A thermometer is inserted through the roof of the oven, as usual, to indicate the temperature. Plaster is poured into the bottom of the oven, made trough-shaped for that purpose.

In operation the articles to be heated are placed in the usual flasks or molds inserted in the oven and clamped by the screw. The door is then closed and heat applied by inserting a lamp or burner under the bottom of the oven. The plaster prevents the bottom from heating too rapidly, while the products of combustion pass freely around on three sides of the oven, thus heating its contents thoroughly, and pass off through the openings in the walls of the outer shell. I thus secure a cheap, simple, and effective apparatus.

I claim as my invention—

The dental heater hereinbefore described, consisting of the combination of the open-bottom perforated casing, and the oven, having its floor covered with non-conducting material, substantially as set forth.

In testimony whereof I have hereunto subscribed my name.

FERDINAND HEINDSMANN.

Witnesses:
   FRANCIS C. HANNSTAD,
   DAVID ENGEL.